US010397232B2

(12) United States Patent
Hashmi et al.

(10) Patent No.: US 10,397,232 B2
(45) Date of Patent: Aug. 27, 2019

(54) CONTROLLING USER ACCESS TO COMMAND EXECUTION

(71) Applicant: Amazon Technologies, Inc., Seattle, WA (US)

(72) Inventors: Omer Hashmi, Chevy Chase, MD (US); Katherine Yichen Chung, North Bethesda, MD (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/750,868

(22) Filed: Jun. 25, 2015

(65) Prior Publication Data

US 2016/0381032 A1 Dec. 29, 2016

(51) Int. Cl.
*H04L 29/08* (2006.01)
*H04L 29/06* (2006.01)
*G06F 9/455* (2018.01)
*G06F 9/50* (2006.01)

(52) U.S. Cl.
CPC ........ *H04L 63/102* (2013.01); *G06F 9/45512* (2013.01); *G06F 9/45533* (2013.01); *G06F 9/5072* (2013.01); *H04L 67/10* (2013.01); *H04L 67/306* (2013.01); *H04L 63/10* (2013.01)

(58) Field of Classification Search
CPC ...... H04L 63/102; H04L 47/70; G06F 9/5072
See application file for complete search history.

(56) References Cited

U.S. PATENT DOCUMENTS

| 5,421,009 | A | 5/1995 | Platt |
| 7,453,593 | B1 | 11/2008 | Parkinson |
| 7,475,419 | B1 | 1/2009 | Basu et al. |
| 8,296,419 | B1 * | 10/2012 | Khanna ................. G06F 9/5072 709/201 |
| 9,009,217 | B1 | 4/2015 | Nagargadde et al. |
| 2003/0088786 | A1 * | 5/2003 | Moran ................. G06F 21/6218 726/4 |

(Continued)

FOREIGN PATENT DOCUMENTS

| JP | 6-12347 A | 7/1994 |
| JP | 2009-217497 A | 9/2009 |

(Continued)

*Primary Examiner* — Ellen Tran
(74) *Attorney, Agent, or Firm* — Robert C. Kowert; Meyertons, Hood, Kivlin, Kowert & Goetzel, P.C.

(57) ABSTRACT

Techniques are described for providing users with access to perform commands on network-accessible computing resources. In some situations, permissions are established for user(s) to execute command(s) on computing node(s) provided by an online service, such as by maintaining various permission information externally to those provided computing nodes for use in controlling users' ability to access, use, and/or modify the provided computing nodes. An interface component may use such external permissions information to determine if a particular user is authorized to execute one or more particular commands on one or more particular computing nodes, and to initiate simultaneous and independent execution of the command(s) on the computing node(s) when authorized. The interface component may further aggregate results from each computing node that executed the command(s), prior to providing the results to the user.

19 Claims, 7 Drawing Sheets

(56) References Cited

U.S. PATENT DOCUMENTS

| | | |
|---|---|---|
| 2004/0049535 A1 | 3/2004 | Volkov et al. |
| 2005/0027863 A1 | 2/2005 | Talwar et al. |
| 2007/0282964 A1 | 12/2007 | Behrend et al. |
| 2009/0228821 A1 | 9/2009 | Tapper |
| 2010/0153955 A1 | 6/2010 | Sirota et al. |
| 2011/0154328 A1* | 6/2011 | Mo .................... G06F 9/45541 718/1 |
| 2014/0075029 A1 | 3/2014 | Lipchuk et al. |
| 2014/0196029 A1 | 7/2014 | Kannan et al. |
| 2015/0058460 A1* | 2/2015 | Seago .................... H04L 41/28 709/223 |
| 2015/0113589 A1 | 4/2015 | Lemaster et al. |
| 2015/0128250 A1 | 5/2015 | Lee et al. |

FOREIGN PATENT DOCUMENTS

| | | |
|---|---|---|
| JP | 2011-186775 A | 9/2011 |
| JP | 2012-511784 A | 5/2012 |
| WO | 2010/068592 A1 | 6/2010 |

\* cited by examiner

CONTROLLING USER ACCESS TO COMMAND EXECUTION

BACKGROUND

Many companies and other organizations operate computer networks that interconnect numerous computing systems to support their operations, with the computing systems being alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

While network-accessible services exist that provide access of users to virtual machines and other computing-related resources controlled by the services, various problems with such access exist.

DETAILED DESCRIPTION

Figure 1:
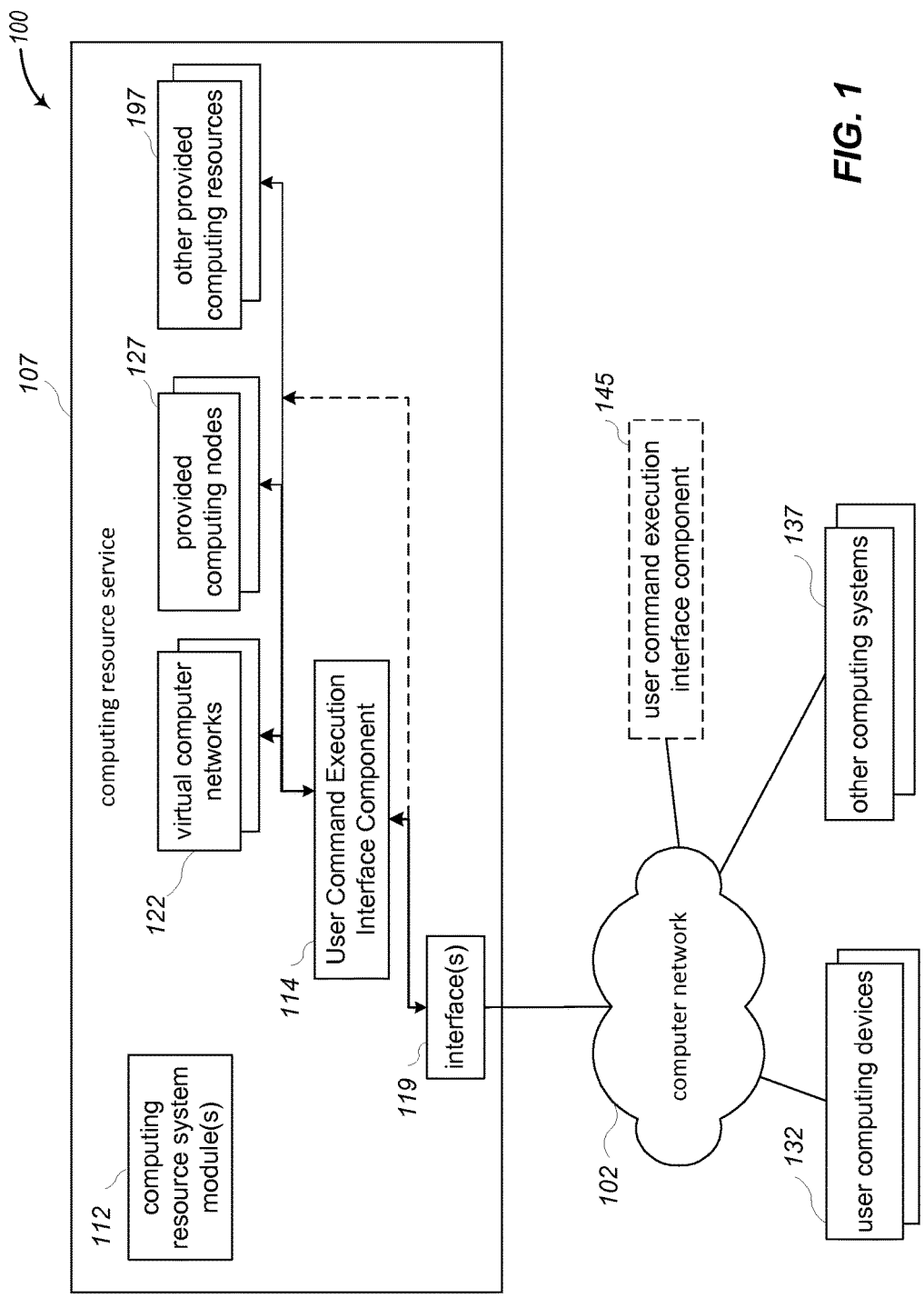
FIG. 1 is a network diagram illustrating an example environment in which techniques for providing users with access to perform commands on network-accessible computing resources may be used.

Techniques are described for controlling network-accessible computing resources, such as computing nodes and other computing-related resources provided by a service provider environment to customers and other users. In at least some embodiments, a service provider environment may provide a user command execution interface component for use by such users, such as to provide an interface with similarities to a shell tool. The user command execution interface component may further maintain various permission information to use in controlling users' ability to access, use, and/or modify provided computing nodes and other computing-related resources, such as permission information stored externally to those provided computing nodes and other computing-related resources.

The user command execution interface component may in at least some embodiments determine if a user is authorized to execute one or more indicated commands on one or more computing nodes or other computing-related resources. If it is determined that the user is authorized, the user command execution interface component may then perform or otherwise initiate execution of the command(s) on the computing-related resource(s). For example, when the computing-related resource(s) include computing nodes that execute programs, the command(s) may be provided to and executed by those computing nodes—alternatively, if the computing-related resources include storage-related resources, the user command execution interface component may execute the command(s) on those storage-related resources, such as to cause data to be stored or retrieved. Operation of the user command execution interface component may be initiated, for example, by a user of a client device that provides one or more commands to a shell aggregator module of the user command execution interface component to execute on information about one or more computing-related resources on which to execute the command(s). The shell aggregator module determines if the user is authorized to execute the command(s) on the computing-related resource(s), such as by querying a permission broker module of the user command execution interface component to determine if the user is authorized for such actions, or by otherwise using stored permissions information external to the computing-related resource(s)—such permissions information may have various forms and be used in various manners, as described in greater detail below. If the user is authorized, the shell aggregator module interacts with each of the computing-related resource(s) to cause that computing-related resource to execute the command(s) or to otherwise implement the command(s) for that computing-related resource. In some embodiments, the shell aggregator module may employ a shell transport layer module to establish secure connections with particular computing-related resources and to provide command(s) to those computing-related resources, as well as to optionally obtain results from such command execution to provide to the requesting user.

The user command execution interface component may in at least some embodiments further aggregate results received from multiple computing nodes or other computing-related resources before providing such aggregated results to a requesting user. In this manner, the user command execution interface component may provide for efficient management by a user of numerous related computing-related resources, such as by facilitating the simultaneous and independent execution of one or more commands on a plurality of computing nodes. For example, the shell aggregator module may manage one or more commands to be executed on multiple computing-related resources, including a group of related computing nodes (e.g., multiple computing nodes in a virtual computer network being provided to a user by a service provider environment; multiple computing nodes in one of multiple logical subnets of such a virtual computer network; multiple computing nodes that have been user-tagged to share a common tag, whether by the requesting user and/or other users; multiple computing nodes in a common geographical location, such as one of multiple geographical locations supported by a service provider environment and corresponding to one or more data centers associated with that geographical location; etc.). In various embodiments, the shell aggregator module manages results from each of those computing-related resources prior to providing the results to the user, including by aggregating the results from a plurality of different computing nodes (that executed the same command(s)) prior to the shell aggregator module providing the aggregated results to the user. In addition, a request from a user may have various forms, such as to, for example, indicate a specific command to be performed on a specific computing node. Alternatively, the request may include a high-level directive or other information that the shell aggregator module uses to identify multiple corresponding commands, and/or may include an indication of a defined group of multiple computing nodes or other computing-related resources, or otherwise include information that the shell aggregator module uses to identify multiple such computing-related resources.

In at least some of the embodiments described below, the described techniques may be used with commands for computing-related resources provided by one or more service provider environments. In other embodiments, the described techniques may be used with other types of computing-related resources. Embodiments discussed below are provided for illustrative purposes and are simplified for the sake of brevity, and the inventive techniques may be used in a wide variety of other situations, some of which are discussed below.

FIG. 1 is a network diagram illustrating an example of a computing resource service that provides user-configurable managed computing nodes and/or virtual computer networks to a user. After one or more such managed computing nodes and/or virtual computer networks are configured and provided by the computing resource service for a user of the computing resource service, the user may interact from one or more remote locations with the provided computing node(s) and/or virtual computer network(s), such as to execute programs on the computing nodes, to dynamically modify the provided virtual computer network(s) and/or the provided computing node(s) while they are in use, etc. The described techniques for providing users with access to perform commands on network-accessible computing resources and associated functionality may be used in some embodiments with such a computing resource service, as discussed in greater detail elsewhere herein, including with respect to the examples of FIGS. 2A-2B and the flowcharts illustrated and described in conjunction with FIGS. 4-6.

In particular, example system 100 of FIG. 1 includes a computing resource service 107 implemented using one or more configured computing systems (not shown) to provide functionality over one or more computer networks 102 (e.g., over the Internet) to users (not shown) using user computing devices 132. The computing resource service 107 may, for example, be part of an environment provided by a service provider entity, such as a network service available over the Internet or other network. The computing resource service 107 enables the users to access and use computing nodes, virtual computer networks and/or other computing resources provided to the user by the computing resource service 107, although in other embodiments and situations a particular computing resource service may provide a subset of such types of computing-related resources (e.g., only one of computing nodes, virtual computer networks, and other computing resources). For example, a number of users interact over the computer network 102 with computing resource system module(s) 112 of the computing resource service 107 to create and configure various provided computing nodes 127 and/or virtual computer networks 122 being provided by the computing resource service 107. In this example embodiment, the computing resource system module(s) 112 assist in providing functionality of the computing resource service 107 to the remote users. In addition, the computing resource service 107 includes a user command execution interface component 114 to further assist in providing functionality of the computing resource service 107 to the remote users, such as to perform some or all of the described techniques to control access of users to the provided computing nodes 127, provided virtual computer networks 112, and/or other provided computing resources 197 (e.g., databases, storage volumes, or other storage structures). In other embodiments, the user command execution interface component may operate separately from one or more such computing resource services (e.g., be provided by a first operator entity that is distinct from one or more other second operator entities providing those one or more computing resource services), such as for an optional separate user command execution interface component 145 to control user access to such computing resource services if the computing resource services are affiliated with the separate user command execution interface component (e.g., customers of or otherwise clients of the user command execution interface component), whether instead of or in addition to any such user command execution interface components 114 of such computing resource services.

In at least some embodiments, the computing resource system module(s) 112 and the user command execution interface component 114 may execute on one or more computing systems (not shown) of the computing resource service 107, and may provide one or more interfaces 119 for use by users of the computing resource service 107, such as one or more APIs (application programming interfaces) that enable remote computing systems to programmatically interact with the computing resource service to access some or all functionality of the computing resource service 107 on behalf of users (e.g., to create, configure, and/or initiate use of provided computing nodes 127 and/or managed virtual computer networks 122). In addition, in at least some embodiments, the interface(s) 119 may include one or more GUIs (graphical user interfaces) via which users manually interact with the computing resource service 107 to perform some or all such actions.

In the illustrated embodiment, when users of computing devices 132 use the interface(s) 119 to send commands or related requests intended for the provided computing-related resources 127, 122 and 197, at least some such commands or related requests are directed to the user command execution interface component 114 to determine whether and how to perform such commands or related requests, with the user command execution interface component 114 then performing subsequent interactions with the provided computing-related resources 127, 122 and 197 on behalf of the user as appropriate. As described in greater detail elsewhere, such interactions may include, for example, one or more of the following: modifying or otherwise altering the operation of one or more such computing-related resources 127, 122 and 197 by performing one or more commands on them (e.g., executing commands by provided computing nodes 127, applying commands to provided virtual computer networks 112 and/or other computing resources 197, etc.); gathering status information from one or more such computing-related resources 127, 122 and 197 by performing one or more commands on them, and optionally providing results of the commands (whether aggregated or individualized) to a requesting user; modifying which computing-related resources 127, 122 and 197 are in use for the requesting user, such as by terminating or stopping use of particular computing-related resources that were previously allocated to and provided for the user, and/or by adding or otherwise initiating use of additional provided computing-related resources 127, 122 and 197 for the user; etc. In some embodiments and situations, some commands or other related requests intended for the provided computing-related resources 127, 122 and 197 may be sent directly to those provided computing-related resources without being controlled by the user command execution interface component.

The computer network 102 may be, for example, a publicly accessible network of linked networks, possibly operated by distinct parties, such as the Internet. Similarly, the computing resource service 107 may include one or more internal networks (not shown) for connecting computing systems of the computing resource service 107 to each other, such as internal networks that are separate and distinct from the computer network 102.

Each of the provided virtual computer networks 122 may be configured in various ways by the users for whom they are provided. In some situations, at least some such virtual computer networks may be created and configured as network extensions to existing remote private computer networks of users, although in the illustrated embodiment the provided virtual computer networks 122 are not shown to be connected to such other existing computer networks. In addition, at least some such virtual computer networks may each be a private computer network that is accessible only by the user that creates it, although in other embodiments at least some computer networks provided by the computing resource service 107 for users may be publicly accessible. In the illustrated example, each of the provided computer networks 122 includes multiple computing nodes (not shown), at least some of which are from the plurality of computing nodes 127 provided by or otherwise under the control of the computing resource service 107, while in other embodiments at least some other computing systems 137 may be used to provide some or all computing nodes for one or more of the provided virtual computer networks 122—such other computing systems 137 may, for example, be provided by or under control of the user for whom a virtual computer network 122 that uses those other computing systems 137 is provided, or may be computing systems that are provided by third parties (e.g., for a fee). For example, in at least some embodiments, each provided virtual computer network 122 may include a customer-configured quantity of multiple such computing nodes that are dedicated for use as part of that provided computer network. In particular, a user may interact with the computing resource system module 112 to configure a quantity of computing nodes to initially be included in a computer network provided for the user (e.g., via one or more programmatic interactions with an API provided by the computing resource service 107), and may further configure a network topology of the provided virtual computer network (e.g., one or more logical subnets that each includes one or more of the provided computing nodes 127, virtual router devices and other virtual networking devices, endpoints for VPN (virtual private network) connections or connections to other external entities, etc.).

In addition, the computing resource service 107 may provide multiple different types of computing nodes in at least some embodiments, such as, for example, computing nodes with various performance characteristics (e.g., processor speed, memory available, storage available, etc.) or other capabilities. If so, in at least some such embodiments, a user may specify the types of computing nodes to be included in a provided computer network for the customer. In addition, in at least some embodiments, the computing nodes may be physical computing systems or may be virtual machines that are each hosted on one or more physical computing systems or physical computing machines, and the communications that are handled for managed virtual computer networks may include transmissions of data (e.g., messages, packets, frames, streams, etc.) in various formats. Furthermore, in at least some situations, an embodiment of the computing resource service may be part of or otherwise affiliated with a program execution service (or "PES") that executes multiple programs on behalf of multiple users of the service, such as a program execution service that uses multiple computing systems on multiple physical networks (e.g., multiple physical computing systems and networks within one or more data centers), optionally in multiple geographical locations. Thus, computing-related resources 127, 197 and/or 122 may be provided for users in various manners in various embodiments, and may be configured to have various types of functionality in various embodiments.

Figure 2A:
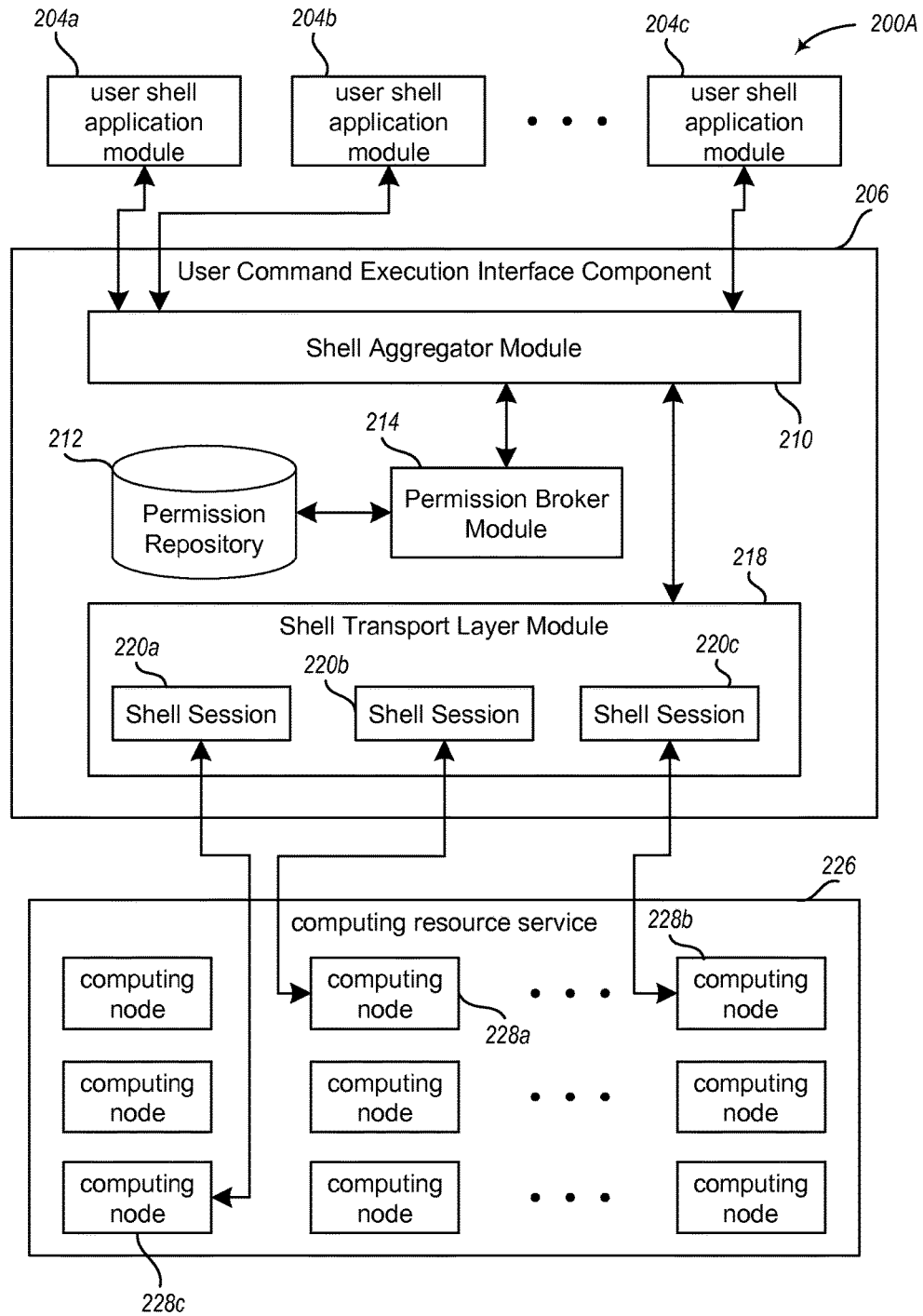
FIGS. 2A-2B illustrate examples of providing users with access to perform commands on network-accessible computing resources.
Figure 2B:
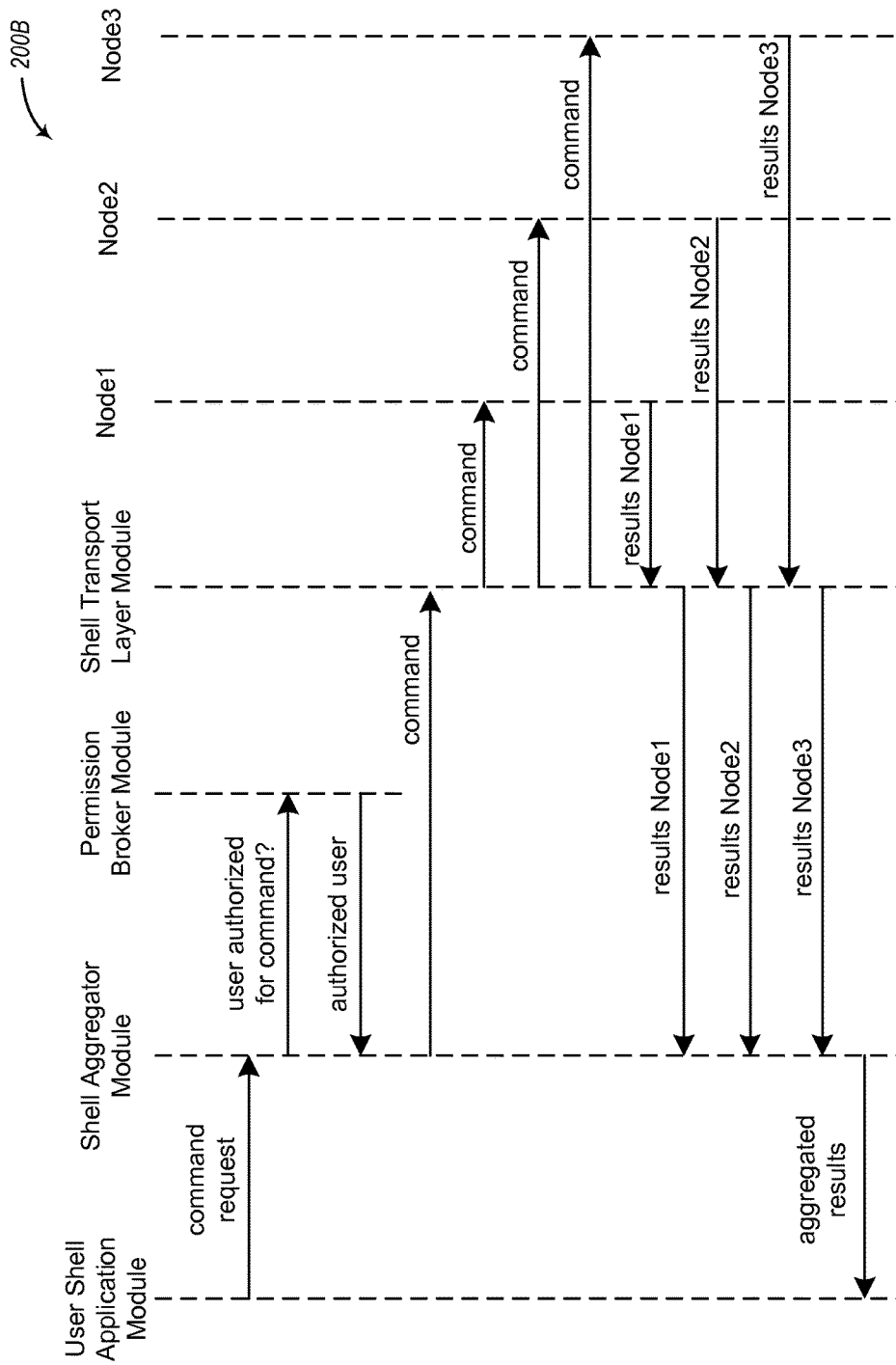

FIGS. 2A-2B illustrate examples of providing user access to perform commands on network-accessible computing resources, such as may be provided by the computing resource computing resource service of FIG. 1. As described herein, the computing resource service provides computing nodes for use by users of the computing resource service.

FIG. 2A illustrates example system 200A, which includes user shell application modules 204, user command execution interface component 206, and computing resource service 226. The user shell application modules 204*a-c* may, for example, execute on client devices (not shown) of users to enable the users to provide commands and other related requests to computing nodes 228 of the computing resource service 226.

The user command execution interface component 206 provides a front-end interface to the computing resource service 226 that receives commands and other related requests provided by the user shell application modules 204 for a user. The user command execution interface component 206 provides functionality to determine if the user is authorized to execute one or more commands on one or more of the computing nodes 228. If the user is authorized, the user command execution interface component 206 performs interactions with at least one of those computing nodes 228 to cause those computing nodes to execute the command(s). The user command execution interface component 206 also receives results from the computing nodes 228 from the execution of the command(s), if appropriate, and if so may aggregate those results in some situations before providing the results to a corresponding user shell application module 204 for the user.

In the illustrated embodiment, the user command execution interface component 206 includes a shell aggregator module 210, a permission broker module 214, and a shell transport layer module 218. The shell aggregator module 210 receives commands and other related requests from a user shell application module 204 in use by a user, and queries the permission broker module 214 to determine if the user is authorized to execute one or more corresponding commands on one or more computing nodes 228 (e.g., computing nodes 228a-c, if those computing nodes are previously allocated to and provided for use by the user or instead for another user under whose authority or direction the user may be acting). If the user is authorized to execute the command on the computing nodes 228a-c, the shell aggregator module 210 instructs the shell transport layer module 218 to perform corresponding interactions with the computing nodes 228a-c to cause the computing nodes 228a-c to execute the command, and to receive results if appropriate. The shell aggregator module 206 receives results from the execution of the command on the computing nodes 228a-c from the shell transport layer module 218, if received by the module 218, and optionally aggregates the results before providing the results to the user shell application module 204.

The permission broker module 214 accesses permission repository 212 to obtain the permissions of the user, and compares the obtained permissions with the user's identity, the command to be executed, and the computing nodes on which to execute the command. The permission repository 212 maintains permissions for one or more users, where the permissions for each user identify what commands the user is authorized (or not authorized) to execute and on which computing nodes. In this way, the user command execution interface component can maintain and use permissions information external to the computing nodes 228, including to determine whether one or more commands are authorized for one or more particular computing nodes without interacting with those computing nodes, and can block interactions by the user with those computing nodes if the user is not authorized to perform those commands (or any commands) on those computing nodes. Permissions information may be specified and used in various manners in various embodiments, as discussed in greater detail below.

The shell transport layer module 218 establishes connections (e.g., secure connections) with each computing node 228 that is to execute one or more commands. In some embodiments, the shell transport layer module 218 may initialize a separate shell session 220a-c for establishing a secure connection or channel (e.g., secure shell or ssh, etc.) with the computing nodes 228a-c. Once the secure connection is established, the shell transport layer module 218 provides the command to the computing nodes 228a-c for execution, such as to a shell program (not shown) executing on the computing nodes 228a-c. Results from the execution of the command on the computing nodes 228a-c, if any, are returned to the shell transport layer module 218 via the secure connections and shell sessions 220a-c. The shell transport layer module 218 then forwards the results to the shell aggregator module 210. It should be recognized that the shell transport layer module 218 may employ other mechanisms for executing commands on computing nodes or other computing related resources, such as, for example, Windows PowerShell, MySQL, etc.

It should be appreciated that the system 200A may include more or less user shell application modules 204, shell sessions 220, and computing nodes 228 than what is illustrated, and that other embodiments of the user command execution interface component may have more or less modules than are shown.

FIG. 2B illustrates an example sequence 200B for providing user access to perform commands on network-accessible computing resources in accordance with the example system 200A of FIG. 2A. The illustrated example includes three computing nodes provided by the computing resource service (e.g., computing nodes 228a-c, referred to generally as Node1, Node2, and Node3 in this example). A user provides a request to a shell aggregator module via a user shell application module. In the illustrated example, the command request identifies a specific command and the computing nodes (e.g., Node1, Node2, and Node3) to execute the command, although in other situations may have other forms. The shell aggregator module queries a permission broker module to determine if the user is authorized to execute the command on each of the three computing nodes. The permission broker module returns to the shell aggregator module a result indicating whether the user is authorized (as illustrated) or unauthorized (not shown). If the user is authorized, the shell aggregator module provides the command to the shell transport layer module along with indications of the three computing nodes. The shell transport layer module then establishes a connection with each computing node, and provides the command to each computing node for execution. Each computing node—separately and independently of each other—executes the command and provides results from its execution back to the shell transport layer module. It should be recognized that the order in which commands are sent to each of the three nodes or the order in which results are provided back to the shell transport layer module may be different than what is illustrated due to a number of different factors (e.g., computing resources available to the computing nodes to execute the command, network traffic, etc.). The shell transport layer forwards the results to the shell aggregator module. The shell aggregator module then provides the results back to the user via the user shell application module. In some embodiments, the shell aggregator module may pass along the results to the user shell application module as they are received (not shown), or the shell aggregator module may aggregate the results together in one or more of various manners (e.g., by sequentially listing all results; by tallying or combining results from multiple computing nodes and providing a resulting summary, such as a count or accumulation of each of multiple values in the results or types of results; by comparing results and the computing nodes that provided them and providing resulting findings; etc.) before returning them to the user shell application module in other embodiments.

As described above, the command request may be or include a command to be executed on one or more computing nodes; however, in other embodiments, the command request may include a plurality of commands, a group of commands, or a high-level instruction or directive that corresponds to multiple commands without specifically including any of those multiple commands, etc. For example, in some embodiments, the instruction may be a request to obtain information from one or more computing nodes, such as a status request, a request to perform or modify a distributed task among a plurality of computing nodes, a request to obtain information regarding a previously initialized or currently executing distributed task among a plurality of computing nodes; etc. From this instruction, the shell aggregator module 210 determines one or more commands to execute on the one or more computing nodes to fulfill the instruction associated with the command request. In some embodiments, the shell aggregator module may store a list of instructions and the commands associated with each instruction. In this way, the shell aggregator module can look up the commands to provide to the computing nodes based on the received instruction.

In addition, the command request may individually identify one or more computing nodes (e.g., by a computing node name, network address, etc.) or one or more groups of computing nodes to execute a command. For example, the command request may be to execute command_A on all computing nodes in virtual_computer_network_M. In this example, the shell aggregator module determines which computing nodes are within virtual_computer_network_M, such as by querying one of the computing nodes in the virtual computer network for a list of other nodes in the same virtual computer network, and then provides the command to those computing nodes for execution. In other embodiments, the command request may identify a particular computing resource service, computing resource, etc. without identifying each individual computing node. For example, the command request may be "how much additional storage is available for use by user_Z." The shell aggregator module then determines which computing nodes are providing storage to user_Z—where user_Z may be a same or different user than the user that provided the command request. In this way, a user can execute a command on a plurality of computing nodes without separately knowing or providing the command directly from the user to each of the plurality of computing nodes.

As described above, the permission broker module 214 determines if the user is authorized to execute one or more commands on one or more computing nodes. The permission broker module may determine, on a per-command and per-computing node basis (e.g., each command/computing node combination), if the user is authorized to execute each command on each computing node. In some embodiments, the authorization may be an overall determination such that if the user is unauthorized for one command/computing node combination, then the user is unauthorized for the entire command request provided to the shell aggregator module. In other embodiments, the authorization may be individual determinations such that commands are provided to and executed on the computing nodes for command/computing node combinations that the user is authorized, but not for the command/computing node combinations that the user is unauthorized. In this way, some of the requested commands may be executed on some computing nodes but not others, while other commands may be executed on other computer nodes or not at all. In various embodiments, the administrator who establishes the permissions may also indicate whether the permission broker module determines an overall authorization or individualized authorization for each user. In various other embodiments, the users may be internal to the computing resource service or may be external to the computing resource service such as customers of the computing resource service.

Although some embodiments described herein refer to executing a command on a computing node, commands may be provided to or executed on other addressable items, such as, for example, applications, virtualization containers (e.g., operating-system-level virtualization that automates the deployment of applications), etc. In some embodiments, each computing node may include one or more containers, and embodiments described herein may be employed to execute one or more commands on one or more containers on a computing node.

It should be appreciated that the functionality of the shell aggregator module 210, permission broker module 214, and shell transport layer module 218 may be provided as separate modules, as illustrated, or it may be provided by one or more other modules, and optionally with functionality of the permission broker module and/or shell transport layer module being included as part of the shell aggregator module. Similarly, the user shell application module 204 may be optional and the user may provide the command request through a browser, an API call, or other interface. In various embodiments, the functionality of the user command execution component 206, or any of its modules, may be a submodule or subcomponent of another module (e.g., computing resource system module 112 of FIG. 1) of the computing resource service. In some embodiments, the user command execution interface component may operate as a front-end of the computing resource system modules of the computing resource service. In other embodiments, the user command execution component may be a separate module (e.g., as illustrated in FIG. 1) such that the computing resource system modules of the computing resource service enable users to configure computing node(s) or establish permissions of other user(s), separate from the user command execution interface component that enables user(s) to provide requests to execute command(s) on the computing node(s).

It should also be appreciated that the users who receive permissions and provide requests to execute commands on computing nodes may be the same or different users from the users of the computing resource service for which the computing nodes are provided (e.g., the recipient users of the provided computing nodes). For example, a group of computing nodes may be provided to a group of web developers to develop a website for the computing resource service. A user may be designated to act as an administrator of the computing nodes and may provide permissions for other users (e.g., an IT support technician user) to execute specific commands on one or more specific computing nodes within the group of computing nodes provided to the web developers. In this way, the user command execution interface component 206 maintains permissions for specific users to execute particular commands on particular computing nodes independent of permissions maintained by the computing resource service for other users to access the computing nodes. Also, permissions may in some embodiments and situations enable a user to assume the role of other users to execute commands on computing nodes. In yet other embodiments, the permissions may be selected for one or more users based on template permissions (e.g., read-only policy, roles of the users, etc.). Thus, permissions information may be specified and used in various manners in various embodiments. For example, in some embodiments, the user command execution interface component and/or computing resource service may use a federated identity model, and/or may define various roles that have associated access permissions, with each user associated with zero or more such roles. In some embodiments, a particular user may manage or direct a group of multiple users that receive shared access to some or all of one or more computing nodes or other computing-related resources provided to that particular user or for that group, such that all group users have the same access permissions, or instead different group members are assigned different permissions with respect to particular commands or command types and/or with respect to particular computing nodes or types of computing-related resources. Non-exclusive examples of access permissions that may be specified include the following: combinations of users, commands, and/or computing-related resources that are allowed or not allowed; access control lists or other types of access permissions for particular computing-related resources and/or commands and/or users, such as to specify read, write and/or execute access permissions; regular expressions that match commands and/or users and/or computing-related resources that are authorized or not authorized; identifications of user groups or types or other aggregations of multiple users that have specified authorization for all or specific commands and/or computing-related resources; identifications of command groups or types or other aggregations of multiple commands that have specified authorization for all or specific users and/or computing-related resources; identifications of computing resource groups or types or other aggregations of multiple computing resources that have specified authorization for all or specific users and/or commands; identifications of user roles with associated permission information and information about which users are assigned which user roles; one or more scripts or other programs that when executed provide an indication of authorization or not for a combination of one or more users, commands, and/or computing-related resources; etc. When multiple access permissions are specified, priorities or ordering may further be used in some embodiments to determine which specified access permission information to use in a particular situation. In various embodiments, the permission repository 212 may include an allow/deny list of command/computing node combinations that indicates which commands the user is authorized or not authorized to execute and on which computing nodes.

The following is one example of using regular expressions for defining user permissions and determining if a user is authorized to execute a command, although it will be appreciated that such information may be specified in other manners in other embodiments, and/or that other types of access permissions may be used in other embodiments. In this example, a table for each user may be stored in the permission repository, with the table including a list of regular expressions that specify whether the user is or is not authorized to execute matching commands on any computing nodes associated with the user. While the information in this example is not specific to particular computing nodes, it will be appreciated that such information may be further specified as applying to particular computing nodes or groups or types of computing nodes (or other types of computing resources) in other embodiments. When a user provides a command to the shell aggregator module, the permission broker may search through the table for that user looking for a match of the command and the stored regular expressions (e.g., for a first match or a highest priority match, if there are multiple matching expressions). Once a match is identified, the corresponding "allow/deny" permission or action for the matched regular expression indicates whether or not the user is authorized to execute that command. One non-limiting example of such a stored tabled may be as follows:

| User A | |
|---|---|
| MATCH | ACTION |
| /ls/ | ALLOW |
| /cat/ | DENY |
| /.*/ | DENY |

In the above table, the "MATCH" column may include the regular expressions to compare against the command to execute, and the "ACTION" column indicates whether the user is authorized (e.g., allow) or not (e.g., deny) to execute the command that matches the corresponding regular expression. In this example, 'ls' is a command to list the contents of a directory for some operating systems, 'cat' is a command to view the contents of a file for some operating systems, and '.*' is a wildcard expression that matches any combination of zero or more characters. In some embodiments and situations, other more complex regular expressions can also be employed. For example, the regular expression 'ls/home/user-a/*' with the action 'allow' may authorize a user to list the contents of the specific directory '/home/user-a/*', but a later or lower priority regular expression 'ls.*' with the action 'deny' may prohibit the user from listing the contents of any other directory. In the example table above, the two forward slashes ('//') are syntax to indicate that the content between the slashes is a regular expression, although other syntax may also be employed. Also, the entries in the table are for illustrative purposes and are not limited to those shown.

In some embodiments, a user may be allowed to execute one or more commands on one or more computing nodes at a plurality of different permission levels. For example, the user's standard login identity (e.g., username) may have one or more associated first permission levels that authorize the execution of some commands but not other commands. If so, in some embodiments and situations, the described techniques may determine to execute one or more commands that the user has requested that need a higher second permissions level (e.g., administrator privileges) beyond the one or more associated first permission levels based on corresponding specified configuration information, such as on a one-time basis, temporarily, if the user is authored to take over a role or other user identity associated with the higher second permissions level, etc. As one example, the user may provide a request that has multiple commands to be executed which are associated with multiple permission levels. If so, the shell aggregator module queries the permission broker module to determine whether the user is authorized to execute each of the commands on one or more associated computing nodes, such as based on the user's one or more associated first permission levels—if so, the shell aggregator module may initiate the execution of each of the commands using the user's login identity and its one or more associated first permission levels.

Conversely, if the permission broker module indicates that the user is authorized to execute one or more first commands of the requested commands at the user's one or more associated first permission levels, but is not authorized to execute one or more other second commands of the requested commands at the user's one or more associated first permission levels, the shell aggregator module may proceed in various manners in various embodiments and situations. In some such embodiments and situations, the shell aggregator module may initiate the execution of the one or more first commands for the user, but not initiate the execution of the one or more second commands for the user, such as with corresponding error information provided to the user. In other embodiments and situations, the shell aggregator module may not initiate the execution of any of the requested commands if at least one of the requested commands is not authorized. In yet other embodiments, the shell aggregator module may initiate the execution of the one or more first commands for the user using the user's login identity and the one or more associated first permission levels, but take further actions to initiate the execution of the second commands on behalf of the user but by using one or more other higher second permission levels, such as if the user is authorized to take on a role or a login identity of another user that has the higher second permission levels, or configuration information associated with the user allows such use of the higher second permission levels in specified circumstances. For each, such functionality can enable a technician to troubleshoot an end-user's problem by first executing a command using the end-user's permissions and subsequently executing the same command using an administrator's permissions, which can be used to determine if there is a problem with the end-user's permissions, a node issue, etc. As in other situations in which multiple commands are executed on one or more computing nodes, the results from the separate executions at the different permission levels may in some situations be individually passed through to the user, while in other situations they may be aggregated prior to sending to the user. It should also be recognized that the user may in some situations request to execute one or more commands at a plurality of different permission levels, whether in a single request or in multiple requests over time.

In additions, in some embodiments and situations, specified permissions for one or more users may be overridden by an administrator or service owner (whether temporarily or permanently), such that the shell aggregator module and/or permission broker module may deny all command execution requests regardless of those users; permissions. For example, an administrator user may provide an instruction to the user command execution interface component to lockout all command execution on a temporary basis. One nonlimiting example of this may occur during peak hours so that a user does not execute a command that could impact accessibility of the computing nodes to other users (e.g., a system reboot, node upgrades, computationally intensive commands, etc.). In some embodiments, this lockout may be temporary based on a predetermined time period or it may be until the administrator removes the override.

It should be appreciated that other storage mechanisms and data structures may be utilized in other embodiments to store user permissions and what commands the user is authorized or not authorized to execute and on what computing nodes.

Figure 3:
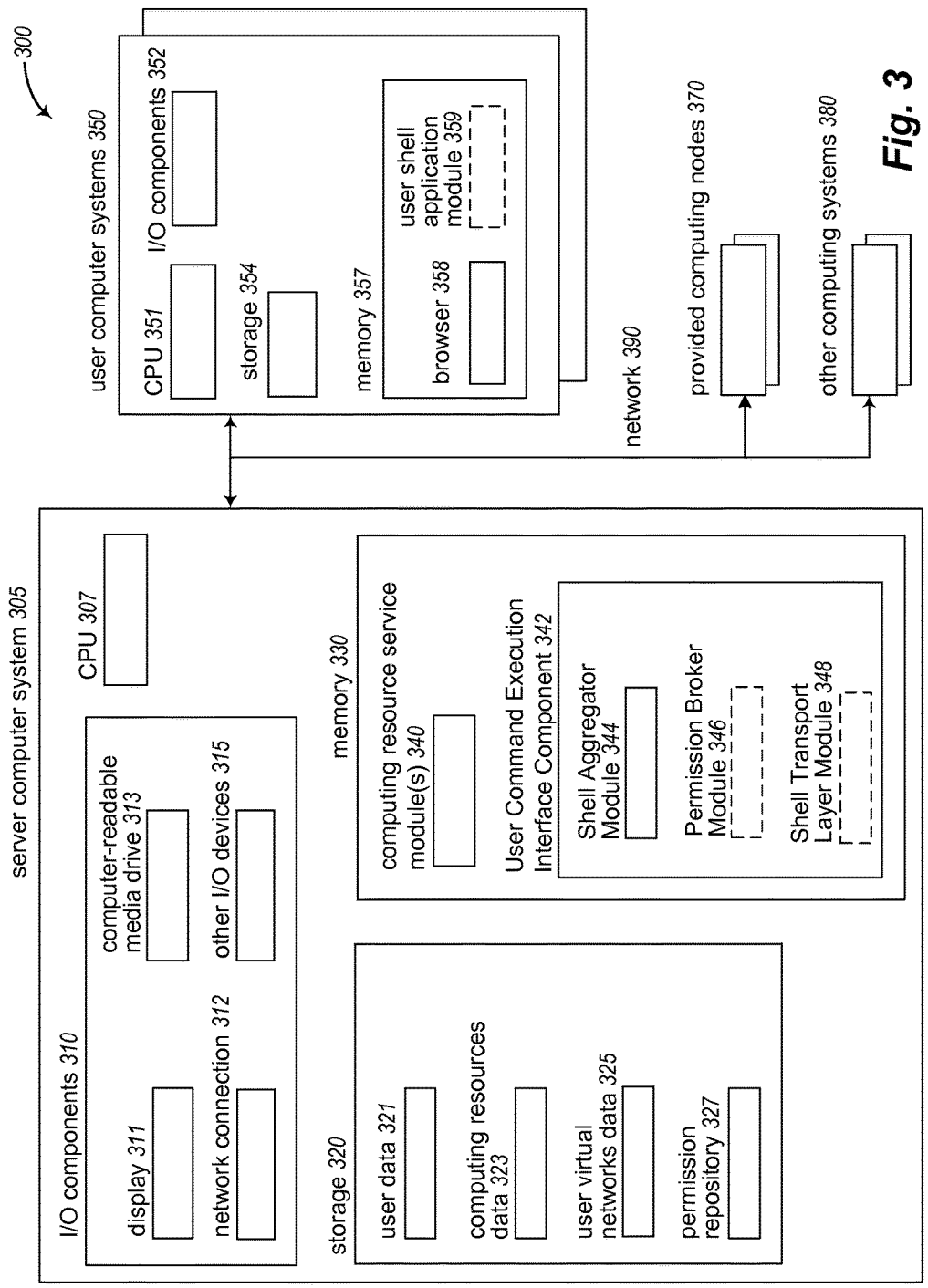
FIG. 3 is a block diagram illustrating example computing systems suitable for executing an embodiment of a system for providing users with access to perform commands on network-accessible computing resources.

FIG. 3 is a block diagram illustrating example computing systems suitable for providing users with access to perform commands on network-accessible computing resources. In particular, FIG. 3 illustrates example system 300, which includes a server computer system 305, user computer systems 350, providing computing nodes 370, and other computing systems 380.

The server computing system 305 is suitable for performing automated operations to provide at least some of the described techniques, including to operate a user command execution interface component 342 and computing resource system module(s) 340 that provides an embodiment of a computing resource service, with which at least part of the described techniques can be used, although in other embodiments the described techniques may be used in other environments that do not include the computing resource service, or the computing resource service may be provided by different server computing systems than those that provide the user command execution interface component.

In the illustrated embodiment, the server computing system 305 has components that include one or more hardware CPU ("central processing unit") computer processors 307, various I/O ("input/output") components 310, storage 320, and memory 330. The illustrated I/O components include a display 311, a network connection 312, a computer-readable media drive 313, and other I/O devices 315 (e.g., a keyboard, a mouse, speakers, etc.). In addition, the user computer systems 350 may each have components similar to those of the server computing system 305, including one or more CPUs 351, I/O components 352, storage 354, and memory 357, although some details are not illustrated for the computing systems 350 for the sake of brevity. The other computing systems 380 may also each include components that are similar to some or all of the components illustrated with respect to the server computing system 305, including to divide provided hardware resources among multiple hosted virtual machines, but such components are not illustrated in this example for the sake of brevity.

One or more modules of the user command execution interface component 342 (e.g., user command execution interface component 114 of FIG. 1 or user command execution interface component 206 of FIG. 2) are stored in memory 330 to control user access to performing commands on network-accessible computing resources described herein, and in some embodiments each includes various software instructions that, when executed, program one or more of the CPU processors 307 to provide the described functionality. The user command execution interface component 342 includes shell aggregator module 344 (e.g., shell aggregator module 210 of FIG. 2) and may optionally include permission broker module 346 (e.g., permission broker module 214 of FIG. 2) and/or shell transport layer module 348 (e.g., shell transport layer module 218 of FIG. 2).

One or more computing resource system modules 340 (e.g., computing resource system modules 112 of FIG. 1) are stored in memory 330 to provide an embodiment of the computing resource service, and in some embodiments each includes various software instructions that, when executed, program one or more of the CPU processors 307 to provide the described functionality. The module(s) of the computing resource system module 340 interact with the user computing systems 350, and the other computing systems 380 over the network 390 (e.g., via local or private networks within the computing resource service, the Internet or World Wide Web, via a private cellular network, etc.).

Various information related to the functionality of the computing resource system modules 340 may be stored in storage 320 and used by the computing resource system modules 340 during operation, such as the following: user data 321 related to particular users (e.g., their account information, specified configuration information for their provided computing resources, etc.); user virtual networks data 325 related to particular virtual computer networks being provided to users (e.g., particular computing resources used by the virtual computer networks, such as with respect to the provided computing nodes 370; specified network topologies and other specified configuration information for the virtual computer networks; etc.); computing resources data 323 related to particular computing resources (e.g., information about other computing resources being provided to users, information about additional computing resources that are available to be used as such provided computing resources, etc., such as with respect to the provided computing nodes 370); permission repository 327 related to user permissions information (e.g., particular command(s) that user(s) are authorized or unauthorized to execute computing nodes(s)).

The other computing systems 380 may be computing systems that are used by the computing resource service to provide virtual computer networks and other computing resources, such as in one or more data centers, not shown, or to provide other functionality or services of one or more computing resource services separate from the user command execution interface component 342.

The user computing systems 350 and other computing systems 380 may be executing various software as part of interactions with the computing resource system module(s) 340. For example, user computer systems 350 may each be executing software in memory 357 to interact with computing resource system module(s) 340 and/or user command execution interface component 342, such as a Web browser 358 or an optional user shell application module 359, including to provide command requests to execute at least one command on at least one computing node, request computing resources from the computing resource service, and to interact with or otherwise use such computing resources.

It should be appreciated that computing systems 305, 350, 370 and 380 are merely illustrative and are not intended to limit the scope of the present invention. The computing systems may instead each include multiple interacting computing systems or devices, and the computing systems may be connected to other devices that are not illustrated, including through one or more networks such as the Internet, via the Web, or via private networks (e.g., mobile communication networks, etc.). More generally, a computing system or other computing node may comprise any combination of hardware or software that may interact and perform the described types of functionality, including, without limitation, desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the computing resource system module(s) 340 and/or user command execution interface component 342 may in some embodiments be distributed in one or more modules, as described elsewhere herein.

It should also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the computing resource system module(s) 340 and/or the user command execution interface component 342) or data structures, such as by execution of software instructions of the one or more software programs and/or by storage of such software instructions and/or data structures. Furthermore, in some embodiments, some or all of the systems or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
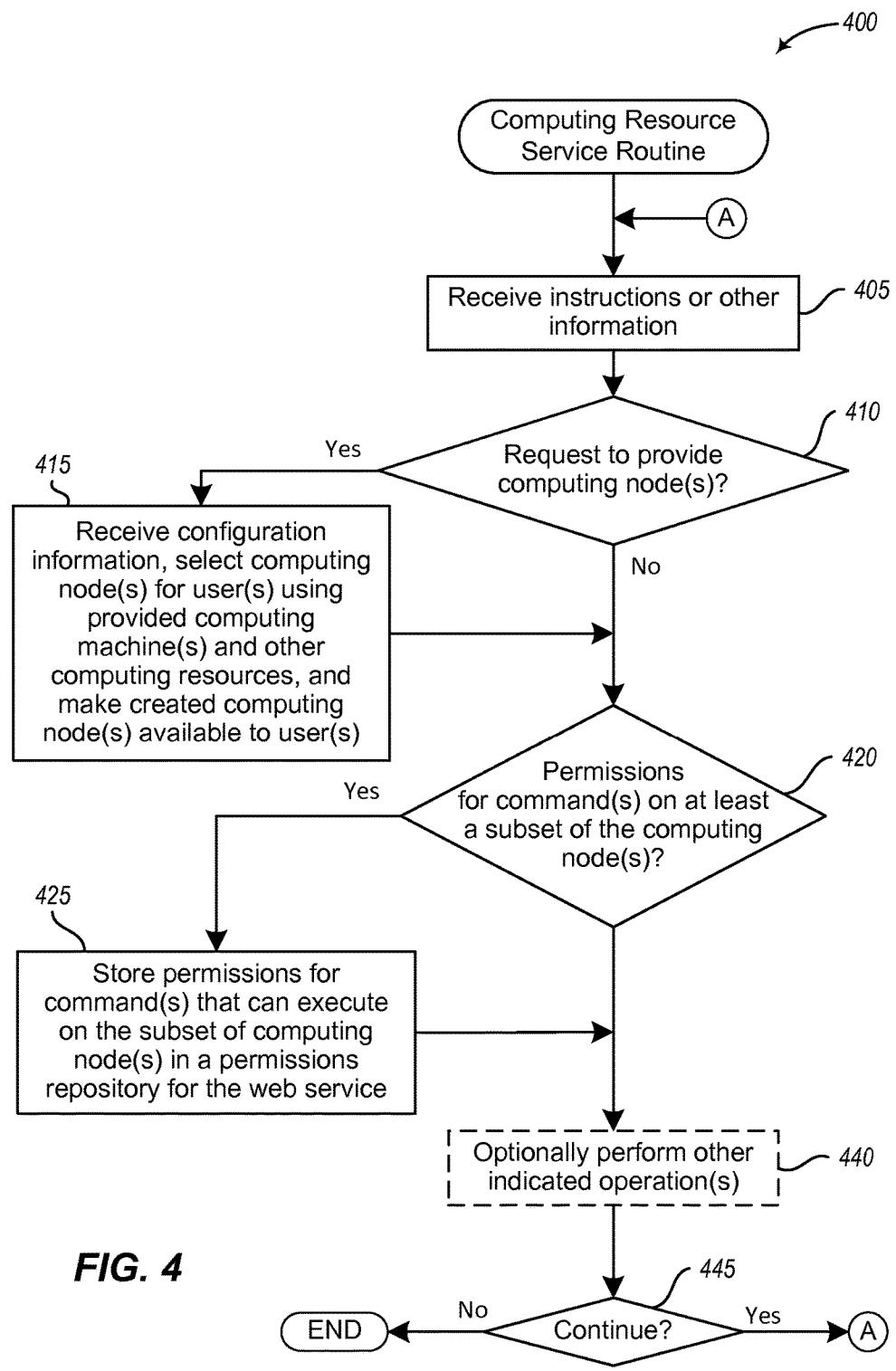
FIG. 4 illustrates a flow diagram of an example embodiment of a Computing Resource Service routine.

FIG. 4 illustrates a flow diagram of an example embodiment of a Computing Resource Service routine 400. The routine 400 may be provided by, for example, execution of the computing resource system module(s) 340 of FIG. 3, the computing resource system module(s) 112 of FIG. 1, or otherwise by an computing resource service as discussed herein, such as to perform the described techniques for providing user-configurable managed computing nodes or other computing-related resources to users and for configuring user access to perform commands on such computing-related resources (e.g., one or more of the managed computing nodes, etc.). While the described techniques for providing users with access to perform commands on network-accessible computing resources and associated functionality are discussed in this example as being at least supported by a computing resource service, it will be appreciated that such functionality may be provided by a distinct system from the computing resource service in other embodiments.

In the illustrated embodiment, the routine 400 begins in block 405, where instructions or other information are received. In some embodiments, the instructions or other information may be from a user, a service owner (e.g., a manager, administrator, etc. of the computing resource service 107 of FIG. 1), etc. In some embodiments, the instructions may be configuration information to customize computing resources provided to or allocated for one or more users, permissions for one or more users to execute one or more commands on one or more computing nodes, etc.

The routine 400 continues to decision block 410 to determine whether the instructions or other information received in block 405 is a request to provide one or more computing nodes to one or more users, and if so the routine 400 continues to block 415.

In block 415, the routine 400 receives configuration information from a user and determines whether the user is authorized for the request (e.g., based on providing required fees, if any; based on previous registration activities of the user with the computing resource service; etc.). If the user is not authorized for the request, then the request is declined and the routine 400 continues to decision block 420, optionally after a corresponding error message is generated and provided to the user. If the user is authorized, then the routine 400 selects one or more computing nodes for one or more users (which may include the user requesting the computing resources) using computing machines and other computing resources provided by the computing resource service, and makes the selected computing node(s) available to the user(s). In some embodiments, a virtual computer network that includes one or more computing nodes may be created for the user(s). In other embodiments, one or more subnets may be created within the virtual computer network such that each subnet includes at least one computing node provided to the user(s).

After block 415, or if it is instead determined in decision block 410 that information is not received in block 405 to provide computing node(s) to one more users, the routine 400 continues to decision block 420 to determine whether information is received in block 405 to create or otherwise modify permissions for one or more users to execute one or more commands on one or more of the computing nodes selected and made available to user(s) in block 415. If permissions are provided, the routine 400 continues to block 425.

In block 425, the routine 400 stores in a permission repository for the computing resource service (e.g., permissions repository 327 of FIG. 3, permission repository 212 of FIG. 2A, etc.) the received permissions indicating which user(s) can execute which command(s) on which computing node(s). Additional details related to the stored permissions and their use are described elsewhere herein.

After block 425, or if it is instead determined in decision block 420 that information is not received in block 405 to store permissions to execute command(s) on one or more computing node(s), the routine 400 continues to block 440. In block 440, routine 400 performs one or more other indicated operation, if any, as appropriate. For example, in some embodiments, the routine may receive requests to manipulate provided computing resources of one or more computing nodes provided to the customer the computing resource service, and if so may perform activities to satisfy such requests if they are authorized. Other types of operations performed with respect to block 440 may include various administrative operations for the computing resource service, such as, for example, performing operations to register new users who can use the provided computing node(s).

After block 440, the routine 400 continues to decision block 445 to determine whether to continue the routine and process additional information, such as until an explicit indication to terminate is received. If it is determined to continue, routine 400 returns to block 405, otherwise, the routine 400 ends.

Figure 5:
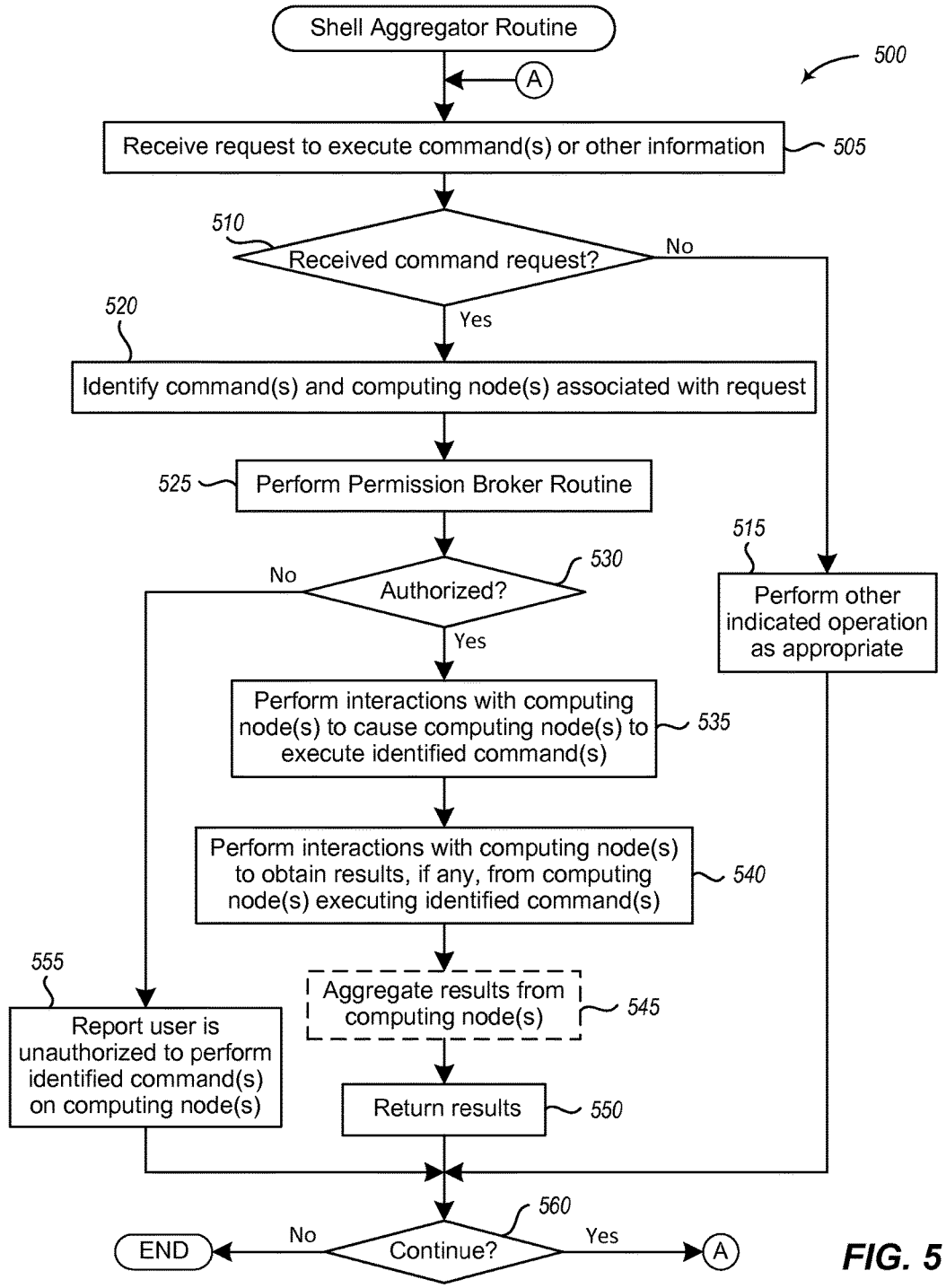
FIG. 5 illustrates a flow diagram of an example embodiment of a Shell Aggregator routine.

FIG. 5 illustrates a flow diagram of an example embodiment of a Shell Aggregator routine 500. The routine 500 may be provided by, for example, execution of the user command execution interface component 206 and/or the shell aggregator module 210 of FIG. 2, the user command execution interface component 342 and/or the shell aggregator module 344 of FIG. 3, and/or the user command execution interface component 114 or 145 of FIG. 1, such as to perform some or all of the described techniques for providing user access to perform commands on network-accessible computing resources. While the described techniques for providing user access to perform commands on network-accessible computing resources and associated functionality are discussed in this example as being provided by the computing resource service, it will be appreciated that such functionality may be provided by a distinct system from the computing resource service (e.g., a CNS computing resource service) in other embodiments.

The routine 500 begins in block 505, where a request to execute a command or other information is received from a user. As described elsewhere herein, the command request may include one or more commands, a plurality of commands, a group of commands, or a high-level instruction or directive (without including a specific command), etc.

After block 505, the routine 500 continues to decision block 510 to determine whether the information received in block 405 is a request to execute a command on one or more computing nodes. If a command request is received in block 505, the routine 500 continues from decision block 510 to block 520; otherwise, the routine 500 continues from decision block 510 to block 515.

In block 515, the routine 500 performs one or more other indicated operations as appropriate. After block 5150, the routine 500 continues to decision block 560.

If the received information in block 505 is a command request, the routine 500 continues from decision block 510 to block 520 to identify one or more commands associated with the received command request and to identify one or more computing nodes for which to execute the identified commands. In some embodiments, the command request may include the commands to execute or the commands may be determined based on other information provided in the request (e.g., using a lookup table to determine one or more commands associated with a high-level instruction, etc.). Similarly, the command request may include an identifier of each of the computing nodes for which to execute the identified commands or the computing nodes may be determined based on other information provided in the request (e.g., an identifier of a group of computing nodes, a virtual computer network, a computing resource service, etc.). In various embodiments, the command request may be to execute all identified commands on all identified computing nodes, but in other embodiments, a first subset of the identified commands may be executed on a first subset of the identified computing nodes, and a second subset of the identified commands may be executed on a second subset of the identified computing nodes. Embodiments, however, are not so limited and other number of subsets of commands and/or computing node may be provided in a command request.

After block 520, the routine 500 continues to block 525 to perform the Permission Broker routine 600 of FIG. 6, which is described in more detail below. Briefly, however, the permission broker routine 600 returns an indication of whether the user (who provided to command request in block 505) is authorized to execute any of the identified command(s) on any of the identified computing node(s).

After block 525, the routine continues to decision block 530 to determine whether the user is authorized to execute the identified command(s) on the identified computing node(s) based on the information received at block 525. If the user is authorized, then the routine 500 continues from decision block 530 to block 535; otherwise, the routine 500 continues from decision block 530 to block 555.

In block 555, a report is provided to the user that the user is not authorized to perform one or more commands for the command request on one or more of the computing nodes identified in block 520. After block 555, the routine 500 continues to decision block 560.

If the user is authorized at decision block 530, the routine 500 continues from decision block 530 to block 535 to perform interactions with the authorized computing node(s) to cause the authorized computing node(s) to execute the authorized commands.

After block 535, the routine 500 continues to block 340 to perform interactions with the authorized computing node(s) to obtain results, if any, from the authorized computing node(s) upon execution of the authorized command(s).

After block 340, the routine 500 continues to optional block 545 to aggregate the results from the authorized computing node(s). After optional block 545, the routine 500 continues in block 550 to return the results to the user (e.g., via a user shell application).

After blocks 515, 550, or 555, the routine 500 continues to decision block 560 to determine whether to continue and process additional information, such as until an explicit indication to terminate is received or after each command associated with an indication provided by a user is performed processed and the user's permissions are determined. If it is determined to continue, the routine 500 returns to block 505; otherwise, the routine 500 ends.

Figure 6:
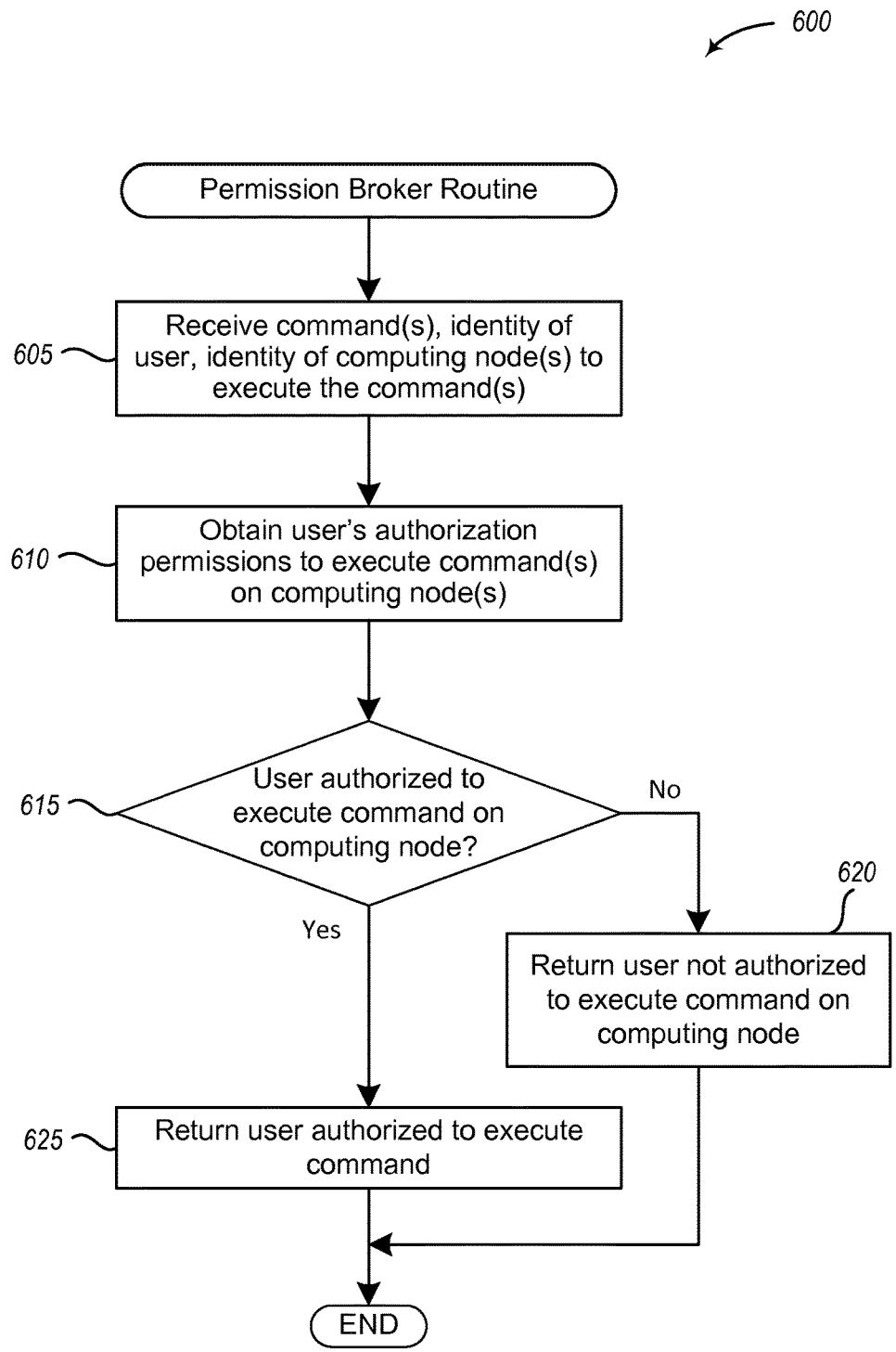
FIG. 6 illustrates a flow diagram of an example embodiment of a Permission Broker routine.

FIG. 6 illustrates a flow diagram of an example embodiment of a Permission Broker routine 600. The routine 600 may be provided by, for example, execution of the user command execution interface component 206 and/or the permission broker module 214 of FIG. 2, the user command execution interface component 342 and/or the permission broker module 346 of FIG. 3, and/or the user command execution interface component 114 or 145 of FIG. 1, such as to perform some of the described techniques for providing user access to perform commands on network-accessible computing resources and associated functionality.

The routine 600 begins in block 605, where one or more commands, an identity of a user, and an identity of one or more computing nodes on which to execute the one or more commands is received. The commands and computing nodes may be identified in block 520 of routine 500 in FIG. 5. And the identity of the user (e.g., a username, user identification number, etc.) may be received in block 505 of routine 500 in FIG. 5 along with the indication of a command; otherwise, the routine may query the user for a username, password, or other identification/authorization information.

After block 605, the routine 600 continues to block 610 to obtain the user's authorization permissions to execute one or more of the commands on one or more of the computing nodes. In various embodiments, the routine may access a permission repository of the computing resource service to obtain the permissions of the user.

After block 610, the routine 600 continues to decision block 615 to determine whether the user is authorized to execute the received command(s) on the identified computing node(s) based on the obtained user permissions. The routine 600 compares the obtained permissions with each command/computing node combination. If the user is not authorized to execute one of the received command(s) on one of the identified computing node(s), then the routine 600 continues from decision block 615 to block 620; otherwise, the routine 600 continues from decision block 615 to block 625.

In block 620, the routine 600 returns an indication that the user is not authorized to execute at least one of the received command(s) on at least one of the identified computing node(s), such as to prohibit, deny, block or otherwise prevent such command(s) from being performed. In block 625, the routine 600 returns an indication that the user is authorized to execute the received command(s) on the identified computing node(s). After blocks 620 or 625, the routine ends.

As described elsewhere herein, the authorization may be for individual command/computing node combinations or it may be for the overall command request. The illustrated routines 500 and 600 of FIGS. 5 and 6, respectively, describes a scenario where the authorization is determined for the overall command request such that if the user is not authorized to execute one command on one computing node, then routine 600 returns to routine 500 that the user is not authorized to execute the command(s) on the computing node(s) for the command request. In various other embodiments, the authorization may be for individual command/computing node combinations such that routine 600 returns to routine 500 each command/computing node combination that the user is authorized and/or each command/computing node combination that the user is not authorized. In this way, blocks 535, 540, 545, and 550 in routine 500 may be employed for each authorized command/computing node combination and block 555 may be employed for each unauthorized command/computing node combination.

It should also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art should appreciate that in other embodiments the operations may be performed in other orders and in other manners. Those skilled in the art should also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it should be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving, by a shell aggregator executing on one or more computing systems, a request from a user indicating a command to be executed by each of a plurality of computing nodes that are provided by a network-accessible service for use by the user and that are each executing one or more programs on behalf of the user, wherein execution of the command by each corresponding computing node of the plurality of computing nodes causes each corresponding computing node to gather information regarding itself;
determining, by the shell aggregator and based at least in part on permissions information stored externally to the plurality of computing nodes, that the user is authorized to have the command be executed by each of the plurality of computing nodes;
initiating, by the shell aggregator and in response to the determining, execution of the command by each of the plurality of computing nodes to gather the information, including:

executing the command by a first computing node of the plurality of computing nodes for the user; and denying execution of the command for the user by a second computing node of the plurality of computing nodes based on additional security information stored locally on the second computing node;

receiving, by the shell aggregator, results including the gathered information from the execution of the command by each of the plurality of computing nodes;

aggregating, by the shell aggregator, the received results to generate aggregated results; and returning the aggregated results to the user.

2. The computer-implemented method of claim 1 further comprising:

receiving, by the one or more computing systems, a second request from the user indicating a second command to be executed by the plurality of more computing nodes;

determining, by the shell aggregator and based at least in part on the stored permissions information, that the user is not authorized to have the second command executed by the plurality of computing nodes; and in response to the determining, denying execution of the second command by the plurality of computing nodes.

3. The computer-implemented method of claim 1 wherein the determining that the user is authorized includes querying a permission broker external to the plurality of computing nodes to obtain stored permissions information specific to the user and to compare the obtained stored permissions information with the command and the plurality of computing nodes to identify a match.

4. The computer-implemented method of claim 3 wherein the comparing of the obtained stored permissions information with the command and the plurality of computing nodes includes matching the command to one or more regular expressions stored in the obtained stored permissions information.

5. The computer-implemented method of claim 3 wherein the comparing of the obtained stored permissions information with the command and the plurality of computing nodes includes matching the command to one or more access control expressions stored in the obtained stored permissions information.

6. The computer-implemented method of claim 1 wherein the command is a shell command, and wherein the method further comprises, before the initiating of the execution of the command, establishing, by the shell aggregator, secure connections via a shell transport layer to the plurality of computing nodes, and wherein the initiating of the execution of the command by the plurality of computing nodes includes providing, by the shell aggregator and to the plurality of computing nodes, the shell command via the established secure connections to cause the plurality of computing nodes to execute the shell command.

7. The computer-implemented method of claim 1 wherein the execution of the command causes current status information to be obtained from the first computing node of the plurality of computing nodes and to be included in the results received from the execution of the command by each of the first computing node of the plurality of computing nodes.

8. The computer-implemented method of claim 1 wherein the execution of the command modifies ongoing operations on the first computing node of the plurality of computing nodes.

9. The computer-implemented method of claim 1 wherein the receiving of the request includes receiving a high-level directive that corresponds to a plurality of commands, and wherein the initiating of the execution further includes identifying the plurality of commands and initiating execution of each of the plurality of commands by each of the first computing node of the plurality of computing nodes.

10. A non-transitory computer-readable medium including stored contents that cause a computing system to at least:

receive, by the computing system, information from a first user indicating a high-level directive corresponding to operations to perform on a plurality of computing-related resources provided from a network-accessible service, wherein the plurality of computing-related resources include first and second computing nodes;

determine, by the computing system and based on the high-level directive, a plurality of commands to execute for the plurality of computer-related resources by the plurality of computer-related resources;

determine, by the computing system and based at least in part on permissions information for the first user that is stored externally to the plurality of computing-related resources, that the first user is authorized to execute the plurality of commands for the plurality of computing-related resources;

initiate, by the computing system, execution of the plurality of commands for the plurality of computing-related resources by the plurality of computer-related resources, including:

perform, by the first computing node and without additional security verification, the plurality of commands for the first user;

identify, by the second computing node, that additional security information stored on the second computing node disallows performing at least one command of the plurality of commands for the first user by the second computing node; and deny, by the second computing node and based on the identifying, performance of the at least one command for the first user by the second computing node;

receive, by the computing system, results from the execution of the plurality of commands for the plurality of computing-related resources;

aggregate, by the computing system, the received results to generate aggregated results; and return the aggregated results to the first user.

11. The non-transitory computer-readable medium of claim 10 wherein the plurality of computing-related resources include multiple computing nodes, and wherein the stored contents include software instructions that, when executed, further cause the computing system to perform the execution of the plurality of commands by:

causing each of the multiple computing nodes to execute each of the plurality of commands and to provide current status information to a shell aggregator executing on the computing system;

aggregating, by the shell aggregator, the current status information from the multiple computing nodes; and providing the aggregated current status information to the first user.

12. The non-transitory computer-readable medium of claim 10 wherein the execution of the plurality of commands includes altering operation of the first computing node.

13. The non-transitory computer-readable medium of claim 10 wherein the receiving of the information includes receiving an indication of a different second user that has a defined role with second stored permissions information different from first stored permissions information of the first user, and wherein the determining that the first user is authorized is based on determining to allow the first user to assume the defined role of the different second user and that executing the plurality of commands for the plurality of computing-related resources is allowed by the second stored permissions information of the defined role.

14. The non-transitory computer-readable medium of claim 10 wherein the execution of the plurality of commands for the plurality of computing-related resources is performed at a first permission level associated with the first user, wherein the received information further indicates a second command to execute for the plurality of computing-related resources, and wherein the stored contents further cause the computing system to:
  determine, based at least in part on the stored permissions information, that the first user is not authorized to execute the second command for the plurality of computing-related resources at the first permission level;
  identify, by the computing system, a second permission level that is higher than the first permission level and that is authorized to execute the second command for the plurality of computing-related resources; and
  initiate the execution of the second command for the plurality of computing-related resources at the second permission level.

15. The non-transitory computer-readable medium of claim 10 wherein the stored contents further cause the computing system to:
  receive, by the computing system, an instruction to temporarily lock permissions to prohibit execution of commands for the plurality of computing-related resources;
  receive, by the computing system, further information from the first user that indicates a second command to execute for the plurality of computing-related resources; and
  deny, by the computing system and based on the temporarily locked permissions, authorization to execute the second command for the plurality of computing-related resources.

16. The non-transitory computer-readable medium of claim 10 wherein the stored contents further cause the computing system to, before the determining that the first user is authorized, receive the permissions information from a second user that controls access of a group of multiple users including the first user to a group of computing-related resources including the plurality of computing-related resources, and wherein the permissions information includes one or more permissions specific to the user.

17. The non-transitory computer-readable medium of claim 16 wherein the group of computing-related resources includes multiple computing-related resources that are associated with a virtual computer network provided to the first user by the network-accessible service, includes multiple computing-related resources that share a common tag specified by one or more users, or includes multiple computing-related resources in a common geographical location.

18. A system, comprising:
  one or more processors of one or more computing systems; and
  one or more memories storing software instructions that, when executed by at least one of the one or more processors, cause the one or more processors to manage execution of commands by:
    receiving information from a user indicating an shell command to request data from each of a plurality of computing nodes when the shell command is executed by each of the plurality of computing nodes, wherein the plurality of computing nodes are provided for use by the user and are each executing one or more programs on behalf of the user;
    determining, without interacting with the plurality of computing nodes, that the user is authorized to have the shell command be executed by each of the plurality of computing nodes;
    initiating, based on the determining, execution of the shell command by each of the plurality of computing nodes to request the data, including modifying ongoing operation of the executing one or more programs on each of the plurality of computing nodes, including:
      initiating execution of the shell command by a first computing node of the plurality of computing nodes for the user;
      determining that the user is not authorized to have the shell command executed by a second computing node of the plurality of computing nodes; and
      initiating execution of the shell command by the second computing node of the plurality of computing nodes at a higher permission level that is authorized to execute the shell command;
    receiving results that include the requested data from the execution of the shell command by each of the plurality of computing nodes;
    aggregating the received results for the plurality of computing nodes to generate aggregated results; and
    returning the aggregated results to the user.

19. The system of claim 18 wherein the one or more computing systems are part of a network-accessible service that stores permission information for the user and that uses the stored permission information for the determining, and wherein the plurality of computing nodes are provided by the network-accessible service for temporary use by the user.

* * * * *